United States Patent [19]

Horikawa et al.

[11] 3,758,636
[45] Sept. 11, 1973

[54] BLOCK COPOLYMERS OF POLYAMIDES AND AMINO TERMINATED POLYMERIZED ETHYLENICALLY UNSATURATED COMPOUNDS

[75] Inventors: Hideichi Horikawa; Shitomi Katayama, both of Akita; Noboru Masuda, Kawaguchi, all of Japan

[73] Assignee: Denki Onkyo Co., Ltd., Tokyo, Japan

[22] Filed: Apr. 13, 1972

[21] Appl. No.: 243,836

[30] Foreign Application Priority Data
Apr. 13, 1971   Japan.............................. 46/23347

[52] U.S. Cl...... 260/857 G, 260/78 R, 260/857 UN
[51] Int. Cl............................................. C08g 41/04
[58] Field of Search.................. 260/857 G, 857 UN

[56] References Cited
UNITED STATES PATENTS

| | | | |
|---|---|---|---|
| 3,384,681 | 5/1968 | Kobayishi | 260/857 G |
| 3,514,498 | 5/1970 | Okazaki | 260/857 PG |
| 3,632,666 | 1/1972 | Okazaki | 260/857 PG |
| 3,657,385 | 4/1972 | Matzner | 260/857 G |
| 3,683,047 | 8/1972 | Honda | 260/857 G |

Primary Examiner—Paul Lieberman
Attorney—James E. Armstrong, Harold C. Wegner et al.

[57] ABSTRACT

This invention provides a process for manufacturing block copolymers containing amide linkages and polymerized units of ethylenically unsaturated monomers. The process is characterized by polymerizing an ethylenically unsaturated monomer in the presence of a Lewis Acid and an acid polyhalide to give a $\omega,\omega'$-dihalopolymer, which is then converted by ammonolysis or aminolysis into a $\omega,\omega'$-diaminopolymer, which, in turn, is polymerized with a polycondensable monomer such as an amino acid, an ester of an amino acid, a diamine, a dicarboxylic acid, and ester of dicarboxylic acid, dicarboxyloyl halide to give the block copolymer. These new polymers are useful for conventional applications of polyamides and polyvinyl compounds, particularly in those instances where defects of either type of polymer require improvement. These new polymers are useful for many practical applications, since they can be cast or spun into films, fibers, plastics, etc. depending upon their compositions and types of monomers. For example, polystyrenecaproamide can be used as a plastic in a richer composition of caproamide units, and also as a film in the medium composition balance.

18 Claims, No Drawings

BLOCK COPOLYMERS OF POLYAMIDES AND AMINO TERMINATED POLYMERIZED ETHYLENICALLY UNSATURATED COMPOUNDS

BACKGROUND OF THE INVENTION

Polyamides, such as nylon 6 and nylon 66, are used commercially in many fields. Another class of well known commercial polymers are those prepared from ethylenically unsaturated monomers, such as polystyrene and polypropylene. These two series of polymers, i.e., polyamides and polymers of ethylenically unsaturated monomers, have quite different characteristics and properties. With a few exceptions, polyamides are more highly crystalline, easily dyeable and stiff, and have higher melting points, glass transition temperatures and moisture attraction, than the polymers of ethylenically unsaturated monomers. Polymers of ethylenically unsaturated monomers are advantageous because of higher resistivity against light, chemical reagents, electricity and acids and bases. Such polymers also have better moldability and higher plasticity and elasticity. Conversely, corresponding to the above mentioned merits, the two series of polymers have opposite weak points.

This invention provides new block copolymers which have the merits of both series of polymers, with the substantial elimination of the corresponding demerits.

SUMMARY OF THE INVENTION

The polymers of the invention are characterized by a plurality of repeating units of the formula:

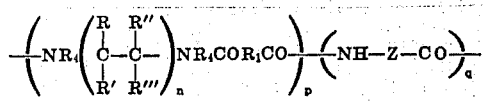

in which:

R, R', R'' and R''' are members selected from the group consisting of alkyl radicals having up to 8 carbon atoms, aralkyl radicals having up to 10 carbon atoms, aryl radicals having up to 10 carbon atoms, alkoxy radicals having up to 8 carbon atoms;

R, R', R'' and R''' also collectively represent a three–seven atom residue of a carbon ring structure which may contain up to two hetero oxygen atoms.

$R_1$ is a member selected from the group consisting of alkylene radicals having from two–12 carbon atoms and arylene radicals having from six–12 carbon atoms;

$R_4$ is a member selected from the group consisting of hydrogen and alkyl radicals having up to six carbon atoms;

Z is a member selected from the group consisting of $-R_2NHCOR_1 -$ and $R_3$;

$R_2$ is a member selected from the group consisting of alkylene radicals having from two–12 carbon atoms and arylene radicals having from six–12 carbon atoms;

$R_3$ is an alkylene radical having from five–16 carbon atoms;

$n$ is an integer having a value of from 1 to 500; and $p$ and $q$ represent the relative molar ratio of each unit and are defined by the formula $(p/p + q) + (q/p + q) = 1$.

The polymers of the invention are made according to the following series of equations in which R, R', R'', R''', $R_1$, $R_2$, $R_3$, $R_4$, $n$, $p$, and $q$ have the values given above. M is a metal, X is a halogen having a molecular weight of at least 35.5, $w$ and $y$ are integers having a value of 2–5, $z$ is 1 or 2, and A is the residue of an acid halide.

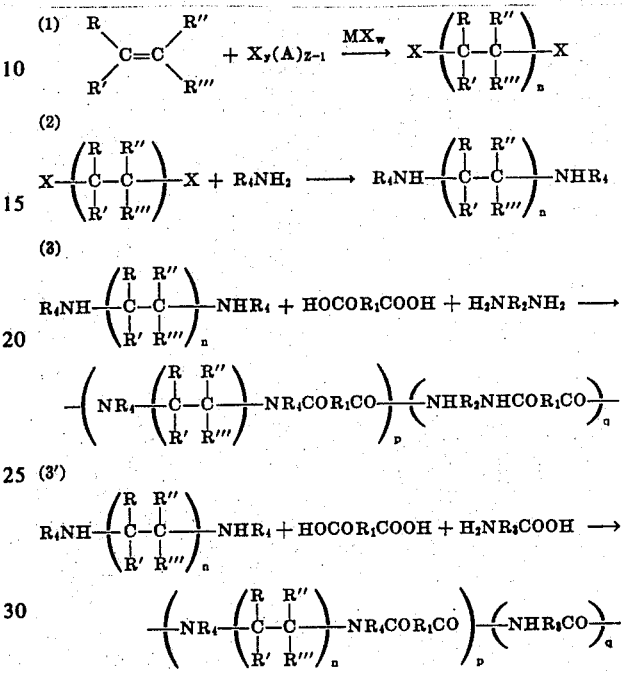

DETAILED DESCRIPTION

The copolymers of the invention are made by a process comprising three important steps. In the first step an ethylenically unsaturated monomer is polymerized in the presence of a Lewis acid and an acid polyhalide to produce a $\omega,\omega'$-dihalopolymer; in the second step this halopolymer is converted to a $\omega,\omega'$-diaminopolymer by ammonolysis or aminolysis; and in the last step the diaminopolymer is polymerized with a polycondensable monomer to produce a block copolymer.

Useful ethylenically unsaturated monomers are those which can polymerize cationically, such as ethylene, propylene, isobutylene, styrene, $\alpha$-methyl styrene, nuclear substituted styrenes, nuclear substituted $\alpha$-methyl styrenes, vinylmethyl ether, $\alpha,\beta$-dimethoxyethylene, vinylphenyl ether, stilbene, vinyloctyl ether, acenaphthylene, and the like.

Suitable Lewis acids are those which initiate cationic polymerization, such as beryllium dichloride, cadmium dichloride, zinc dichloride, boron trichloride, boron tribromide, aluminium trichloride, aluminum aluminium gallium trichloride, titanium tetrachloride, titanium tetrabromide, zirconium tetrachloride, stannous chloride, stannic chloride, stannic bromide, antimony pentachloride, antimony trichloride, bismuth trichloride, ferric chloride, vanadium tetrachloride, and the like. The amount of Lewis acid depends upon the degree of polymerization of the prepolymer. Generally a catalytic amount of Lewis acid ranges between 0.01 to 10 mole percent basec upon the number of moles of starting monomer.

Useful acid polyhalides are those commonly used for halogenation, including thionylchloride, phosgene, phosphorus pentachloride, phosphorus trichloride, phosphorus oxychloride, and phosphorus tribromide. Chlorine, bromine and iodine can be also used as the halogenating reagent. Thus, the acid polyhalide contains two or more halogen atoms in the molecule. Among the molecular halogens, fluorine is not effective. Polymerization in this step is carried out by cationic polymerization techniques using a catalytic amount of the Lewis acid as a catalyst and the acid polyhalide as a halogenating reagent and cocatalyst.

Although not critical, the temperature for the polymerization is generally maintained between −100°C and +75°C, in order to obtain the ω,ω'-dihalopolymer in high yield and high degree of polymerization with the absence of appreciable side reactions.

The polymerization can be performed either in the absence of a solvent or in the presence of a solvent which is suitable for cationic polymerization, such as cyclohexene, bromobenzene, dichloroethylene, nitromethane, nitrobenzene, chlorobenzene, dichlorobenzene, carbon disulfide, ethyl chloride, carbon tetrachloride, hexane, chloroform, benzene, tetrachloroethane, and the like.

In the second step, the ω,ω'-dihalopolymer thus obtained is reacted with an aminating reagent to give the ωω'-diaminopolymer. Suitable aminating reagents include ammonia and primary amines, e.g., primary lower alkyl amines, such as methylamine, ethylamine, propylamines, butylamines, and cyclic polyamines, such as hexamethylenetetramine and the like. Metal amides, such as lithium amide, sodium amide, potassium amide, salts of alkali metals with primary alkylamines, and potassium phthalimide can be also used. Ammonolysis or amination using ammonia or amines is preferably carried out between room temperature and 100°C although higher or lower temperatures can be used without considerable adverse effect.

The aminating reagent is added in at least a slight excess of an equimolar amount, corresponding to the halogen content of the ω,ω'-dihalopolymer, in order to obtain full amination. It is desirable to use ammonia or an amine in excess of twice the equimolar amount of halogen contained in ωω'-dihalopolymer, in order to remove halogen anion resulting from dehydrohalogenation, as well as to obtain full amination. When ammonia or the amine is not used in full excess, the resulting ω,ω'-diaminopolymer should be thoroughly washed with a base, such as an amine, ammonia or an aqueous solution of alkali, to neutralize the halogen salt of the ω,ω'-diaminopolymer.

Ammonia and amines can be reacted with or without the use of a solvent. Suitable solvents include water, alchols, N,N-dimethylformamide, dimethylsulfoxide, benzene, etc., each of which does not decrease the reactivity of either the aminating reagent or the ω,ω'-dihalopolymer. Metal salts of ammonia and amines should be used in an inert non-polar solvent which does not decompose the metal salts; water, alcohols, amines, acids, etc. Should be excluded in this sense. Non-polar solvents given above are suitable.

The reaction time for full amination depends upon the starting materials, the concentration and the temperature, but usually a one to 50-hour period is sufficient.

In the third step, the ω,ω'-diaminopolymer is polymerized with a polycondensable monomer to give a block copolymer, the molecular chain of which consists of amide linkages and polymerized units of ethylenically unsaturated monomers. Suitable polycondensable monomers are those generally used for manufacturing polyamides. Preferred monomers include: amino acids having up to 21 carbon atoms, such as ε-aminocaproic acid, ζ-aminoenanthic acid, η-aminocaprylic acid, θ-aminoperargonic acid, τ-aminocapric acid, 6-aminocyclohexanoic acid, p-aminobenzoic acid, etc., and their esters of lower aliphatic alcohols having up to six carbon atoms such as methanol and ethanol, and of phenol; diamines having up to 21 carbon atoms, such as ethylenediamine, propylenediamine, tetramethylenediamine, hexamethylenediamine, phenylenediamines, xylenediamines, piperazine, etc.; and dicarboxylic acids having up to 21 carbon atoms, such as oxalic acid, malonic acid, succinic acid, glutaric acid, adipic acid, pimelic acid, suberic acid, azelaic acid, sebacic acid, phthalic acids, cyclohexane dicarboxylic acid, xylene dicarboxylic acids, etc. and their esters of lower aliphatic alcohols having up to 6 carbon atoms, such as methanol and ethanol, and of phenol, and the dihalides of these acids. Polycondensation is conducted in alternate ways as follows: i. The ωω'-diaminopolymer is treated with a dicarboxylic acid to give a ωω'-diammonium dicarboxylate polymer, which can be polyerized with the diammonium dicarboxylate salt of the diamine and a dicarboxylic acid or with the amino acid or an ester thereof. The preferred polymerization temperature in this case is between 100°C and 300°C, at which temperature the reaction mixture is heated and melt-polymerized for appropriate time, usually 5 to 10 hours, under an inert atmosphere. ii. The ω,ω'-diaminopolymer blended with the diamine and dissolved in an appropriate solvent that does not decompose the diamine or dicarboxyloyl dihalide, is polycondensed with the dicarboxyloyl dihalide by known interfacial or solution polycondensation techniques. The preferred polymerization temperature ranges from 150°C down to the freezing temperature of the polymerization mixture. The maximum time required for this polymerization is generally about 5 hours. The above two methods represent the most useful polymerization procedures, but the following methods can, of course, also be used. iii. The ω,ω'-diammonium dicarboxylate polymer as obtained in (i) is itself melt-polymerized under the condition described in (i). iv. A polyamide with carboxyl groups at the both ends of the molecular chain is mixed with the ω,ω'-diamino polymer in a solvent to give their salt, which can be melt-polymerized according to the method of (i). Such polyamide can be prepared by the well known method of polycondensation using a slight excess amount of dicarboxylic acid component. In this method, either the polyamide or the ω,ω'-diamino polymer should be preferably of lower molecular weight, in order to obtain good polymer salt. v. The ω,ω'-diammonium dicarboxylate polymer as prepared in (i) is mixed with a polyaminoacid of the amino acid or its ester, e.g., with nylon 6, and the mixture is heated and melt-polymerized according to the method of (i). vi. The ωω'-diaminopolymer is itself polymerized under the condition given in (ii).

In summary, the ω,ω'-diaminopolymer or its dicarboxylate salt is polymerized with polycondensable materials such as: an amino acid, its ester, a dicarboxylic acid, its ester or dihalide, a dicarboxylic polymer, its ester, a diammonium dicarboxylate, a diammonium polymer dicarboxylate, a dicarboxyl polymer diammonium salt, etc., with or without the copresence of another diamine, by either melt, solution or interfacial polymerization techniques.

Block copolymers made according to this invention have many merits in practical use such as: (a) easy dyeability, (b) higher melting point and glass transition point than those of the corresponding homopolymers of ethylenically unsaturated monomers, (c) a higher degree of elasticity, plasticity and moldability, than the corresponding polyamide homopolymers, (d) transparency, melting point, gas transition point, crystallinity, dyeability, solubility, etc. can be controlled by changing the composition of the starting mixture of the ω,ω'-diaminopolymer and polycondensable monomer, (e) higher resistivity against solvents than the corresponding homopolymers of ethylenically unsaturated monomers, and (f) higher electric resistivity than the corresponding polyamide homopolymers.

Our invention is further illustrated by the following examples:

EXAMPLE 1

In a three-necked flask equipped with a stirrer and two condensers, each leading to a nitrogen inlet and a nitrogen outlet, were placed 208.2 g. (2 mole) of styrene, 6.75 g. of aluminum chloride and 46.6 ml. of thionyl chloride. The atmosphere inside the flask was replaced by nitrogen, and the mixture was reacted with stirring at 30°C for 72 hours. Thionyl chloride was removed by vacuum evaporation from the reaction mixture, and the remaining solid was filtered out. The filtrate, on adding a ten times volume of the filtrate of water-methanol mixture (10:90 ratio), gave a precipitate, which was washed with 400 ml. of methanol to give powdery ω,ω'-dichloropolystyrene. Yield, 76.4%., melting point, 66–68.5°C, intrinsic viscosity, 0.0190 in benzene at 30°C; molecular weight calculated from intrinsic viscosity, 1,164; Cl content, 5.48%, molecular weight calculated from chlorine content, 1,320.

A 20 g. quantity of ω,ω'-dichloropolystyrene thus obtained was placed in a 200 ml. steel bomb, into which an excess amount of liquid ammonia was added. The bomb was sealed and its contents were agitated at 40°C for 24 hours. The contents, after evaporating unreacted ammonia, were dissolved in 20 ml. of benzene to give a homogeneous solution, which was poured into a 10 times volume of methanol to give powdery ω,ω'-diaminopolystyrene. Yield 92.0%; melting point, 90.2–95.5°C.

A 60 g. quantity of the ω,ω'-diaminopolystyrene thus obtained was dissolved in 480 ml. of 1:1 volume ratio ethanol-chloroform mixture at 80°C during 30 minutes in a three-necked flask equipped with a condenser, a dropping funnel and a stirrer. In to this solution was dropwise from the dropping funnel during 60 hours 12 g. of adipic acid dissolved in 240 ml. of 1:1 volume ratio ethanol-chloroform mixture. The mixture was stirred further for 10 minutes, and then it was mixed with a 10 times volume of methanol to give powdery ω,ω'-diammoniumpolystyrene adipate (I). Yield, 85.0%; melting point, 107–119°C.

In a glass polymerization tube having a lower nitrogen inlet and an upper nitrogen outlet, were placed 9.5 to 3.174 g. of ε-amino-n-caproic acid and 0.5205 to 3.1251 g. of the thus obtained ω,ω'-diammoniumpolystyrene adipate (I). The mixture inside the tube was melted in a nitrogen atmosphere, and the melt was heated at 220°C for 3 hours and at 240°C for 2 hours both under a continuous nitrogen stream bubbling from the bottom of the polymerization tube. The polymerization conditions and the result are listed in Table 1–1.

TABLE 1-1

| Exp. No.: | ε-amino-n-caproic acid (g.) | (I)[1] (g.) | F₂ | Melting point (°C.) | Intrinsic viscosity | Density (g./cm.³) |
|---|---|---|---|---|---|---|
| 1-1 | 9.500 | 0.5205 | 0.040 | 210–218 | 0.803 | 1.149 |
| 1-2 | 9.500 | 1.0417 | 0.071 | 210–215 | 0.660 | 1.159 |
| 1-3 | 8.000 | 2.0831 | 0.181 | 208–213 | 0.617 | 1.164 |
| 1-4 | 4.760 | 2.0913 | 0.330 | 156–167 | 0.602 | 1.197 |
| 1-5 | 3.174 | 3.1251 | 0.516 | 123–129 | 0.341 | 1.201 |

[1] ω,ω'-diammoniumpolystyrene adipate.

In the same polymerization tube as described above, 0.5208 to 2.083 g. of ω,ω'-diammoniumpolystyrene adipate (I) and 3.7428 to 0.9357 g. of 11-aminoundecanoic acid were placed and the mixture was melt-polymerized under nitrogen bubbling at 220°C for 10 hours. The polymerization conditions and the results are listed in Table 1–2.

TABLE 1-2

| Exp. No.: | 11-amino-n-undecanoic acid (g.) | (I)[1] (g.) | F₂ | Melting point (°C.) | Intrinsic viscosity | Density (g./cm.³) |
|---|---|---|---|---|---|---|
| 1-6 | 3.7428 | 0.5208 | 0.193 | 174–179 | 0.821 | 1.043 |
| 1-7 | 2.8071 | 1.0415 | 0.364 | 162–167 | 0.725 | 1.042 |
| 1-8 | 1.8714 | 1.5623 | 0.543 | 150–155 | 0.654 | 1.041 |
| 1-9 | 0.9357 | 2.0830 | 0.798 | 138–142 | 0.554 | 1.041 |

[1] ω,ω'-diammoniumpolystyrene adipate.

In the same polymerization tube as described above, 5.246 to 1.312 g. of hexamethlenediammonium adipate and 0.521 to 2.084 g. of ω,ω'-diammoniumpolystyrene adipate (I) were placed and the mixture was melt-polymerized under nitrogen bubbling at 220°C for one hour and at 283°C for 6 hours. The polymerization conditions and the results are listed in Table 1–3.

TABLE 1-3

| Exp. No.: | Adipic acid-hexamethylene diamine salt (g.) | (I)[1] (g.) | F₂ | Melting point (°C.) | Intrinsic viscosity | Density (g./cm.³) |
|---|---|---|---|---|---|---|
| 1-10 | 5.246 | 0.521 | 0.188 | 251–257 | 0.813 | 1.118 |
| 1-11 | 3.935 | 1.042 | 0.427 | 240–246 | 0.713 | 1.100 |
| 1-12 | 2.623 | 1.573 | 0.629 | 198–206 | 0.497 | 1.096 |
| 1-13 | 1.312 | 2.084 | 0.841 | 190–196 | 0.374 | 1.092 |

[1] ω,ω'-diammoniumpolystyrene adipate.

In the same polymerization tube described above, 5.3664–1.3416 g. of m-xylene-diamine-adipic acid salt and 0.521–2.083 g. of ω,ω'-diammoniumpolystyrene adipate were admixed and the polymerization was carried out by heating under nitrogen atmosphere at 180°C for 2 hours, the temperature was raised to 260°C during 1 hour, maintained at 260°C for 2 hours and then the polymerization mixture was heated in vacuo of 0.1 mmHg for 1 hour. The results are shown in Table 1–4.

TABLE 1-4

| Exp. No.: | M-xylenediamine-adipic acid salt (g.) | (I)[1] (g.) | F₂ | Melting point (°C.) | Intrinsic viscosity | Density g./cm.³ |
|---|---|---|---|---|---|---|
| 1-14 | 5.3664 | 0.5208 | 0.174 | 215–220 | 0.894 | 1.184 |
| 1-15 | 4.0248 | 1.0415 | 0.368 | 195–199 | 0.764 | 1.150 |
| 1-16 | 2.6832 | 1.5623 | 0.552 | 170–176 | 0.700 | 1.113 |
| 1-17 | 1.3416 | 2.0830 | 0.738 | 149–133 | 0.601 | 1.084 |

[1] ω,ω'-diammoniumpolystyrene adipate.

EXAMPLE 2

A three-necked flask equipped with stirrer, condenser, and nitrogen inlet and outlet was filled with nitrogen and the flask was kept agitated in a reaction bath at 30°C. To the flask, 2 mole (208.2 g.) of styrene, 3.37 g. of anhydrous ferric chloride and 23 ml. of thionyl chloride were added and polymerization was carried out at 30°C for 72 hours.

After polymerization was complete, unreacted thionyl chloride was removed by evaporation and the solids were filtered off. An addition of a 10-fold volume of water-methanol mixed solvent containing 10% water gave a precipitate which was washed sufficiently with 400 ml. of methanol. A powdery polymer was obtained. Yield, 67.1%; Melting point, 95.5–90.0; Intrinsic viscosity, 0.041; Molecular weight calculated from viscosity, 3315; chlorine analyzed, 2.28%; Molecular weight calculated from analyzed chlorine content, 3091.

The powder (20 g.) thus obtained was placed in a 200 ml. steel bomb admixed with excess liquid ammonia, and the bomb was sealed. The reaction was carried out with agitation at 40°C for 24 hours. After the reaction was complete, 20 ml. of benzene was added to make a homogeneous solution and a white powdery polymer was obtained by adding a 10-fold volume of methanol. Yield, 91.5%; Melting point, 103–105°C, chlorine analyzed, 0.00%.

The powder (60 g.) was placed in a three-necked flask equipped with stirrer, condenser, and dropping funnel, and admixed with 480 ml. of 1:1 volume ratio of an ethanol-chloroform mixed solvent to make a homogeneous solution, which was kept under agitation at 80°C.

After 30 minutes, 240 ml. of 1:1 ethanol-chloroform mixed solvent containing 12 g. of adipic acid was added dropwise for 60 minutes. After the addition, the agitation was continued for 10 more minutes. After the reaction was complete, a white precipitate was obtained by adding a 10-fold volume of methanol. Yield, 86.3%; Melting point 113–115°C.

In a glass polymerization tube, 1.421 g. of the powder thus obtained and 5.2468 g. of $\epsilon$-amino-n-caproic acid were added and polymerization was carried out under a nitrogen atmosphere at 220°C for 3 hours and 240° for 2 hours.

The results are shown in Table 2–1.

TABLE 2–1

| Experiment Number | 2–1 |
|---|---|
| $\epsilon$-Amino-n-caproic acid (g) | 5.2468 |
| $\omega,\omega'$-diaminopolystyrene-adipic acid salt (g) | 1.0421 |
| $F_2$ | 0.135 |
| Melting point (°C) | 330–207 |
| Intrinsic viscosity | 0.830 |
| Density (g/cm³) | 1.174 |

EXAMPLE 3

A three-necked flask equipped with stirrer, condenser and nitrogen inlet and outlet was filled with nitrogen and the flask was kept agitated in a reaction bath at 30°C. To this flask, 2 mole (208.2 g.) of styrene, 3.37 g. of anhydrous tin tetrachloride and 46.6 ml. of thionyl chloride were added and polymerization was carried out with agitation at 80°C for 70 hours. After polymerization was complete, unreacted thionyl chloride was removed by vacuum evaporation and the solids were filtered off. An addition of a 10-fold volume of water-methanol mixed solvent containing 10% water gave a precipitate, which was washed sufficiently with 400 ml. of methanol. A powdery polymer was obtained. Yield, 60.3%; melting point, 91–95°C; Intrinsic viscosity, 0.033; Molecular weight calculated from intrinsic viscosity, 2504; chlorine analyzed, 2.96%; Molecular weight calculated from analyzed chlorine content, 2,362.

The powder (20. g.) thus obtained was placed in a 200 ml. steel bomb, admixed with excess liquid ammonia, and the bomb was sealed. The reaction was carried out with agitation at 40°C during 24 hours. After the reaction was complete, 20 ml. of benzene was added to make a homogeneous solution and a white powdery polymer was obtained by adding a 10-fold volume of methanol.

Yield, 94.3%; Melting point, 101.2–103°C; chlorine analyzed, 0.00%.

The powder (60 g.) was placed in a three-necked flask equipped with stirrer, condenser, and dropping funnel, and admixed with 480 ml. of 1:1 volume ratio of an ethanol-chloroform mixture to make a homogeneous solution, which was kept under agitation at 80°C.

After 30 minutes, 1:1 volume ratio ethanol-chloroform containing 12 g. of adipic acid was added dropwise for 60 minutes. After the addition, agitation was continued for 10 more minutes. After the reaction was complete, a white powder was obtained by adding a 10-fold volume of methanol.

In a glass polymerization tube, 1.0421 g. of the powder thus obtained and 5.2468 g. of $\epsilon$-amino-n-caproic acid were added and polymerization was carried out under a nitrogen atmosphere at 220°C for 3 hours and at 240°C for 2 hours.

The results are shown in Table 3–1.

TABLE 3–1

| Experiment Number | 3–1 |
|---|---|
| $\epsilon$-amino-n-caproic acid (g) | 5.2468 |
| $\omega,\omega'$-diaminopolystyrene-adipic acid salt (g) | 1.0421 |
| $F_2$ | 0.159 |
| Melting Point (°C) | 207–212 |
| Intrinsic viscosity | 0.643 |
| Density (g/cm³) | 1.169 |

EXAMPLE 4

A three-necked flask equipped with stirrer, condenser and nitrogen inlet and outlet was filled with nitrogen. To the flask, 239.7 g. of $\alpha$-methyl styrene, 240 ml. of methylene chloride and 46.6 ml. of thionyl chloride were added and the flask was kept at –50°C. After adding 6.75 g. of aluminium chloride, polymerization was carried out with agitation at –50°C for 12 hours. After the polymerization was complete, unreacted thionyl chloride was removed by vacuum evaporation and the solids were filtered off. An addition of a 10-fold volume of water-methanol mixed solvent containing 10% water gave a precipitate, which was washed sufficiently with 400 ml. of methanol and a powdery polymer was obtained. Yield, 70%; Softening point, 160–170°C; Intrinsic viscosity, 0.098; Molecular weight calculated from viscosity, 2260; chlorine analyzed, 3,17%; Molecular weight calculated from analyzed chlorine content, 2240.

The $\omega,\omega'$-dichloropoly-$\alpha$-methylstyrene (20 g.) thus obtained was placed in a 200 ml. steel bomb, admixed with excess liquid ammonia, and the bomb was sealed. The reaction was carried out with agitation at 40°C for 24 hours. After the reaction was complete, 20 ml. of benzene was added to make a homogeneous solution a powdery polymer was obtained by adding a 10-fold volume of methanol. Yield, 94.0%; Melting point, 170–175°C; chlorine analyzed, 0.00%.

The ω,ω'-diaminopoly-α-methylstyrene (60 g.) thus obtained was placed in a three-necked flask equipped with stirrer, condenser, and dropping funnel, and admixed with 480 ml. of 1:1 volume ratio ethanol-chloroform mixture to make a homogeneous solution, which was kept under agitation at 80°C. After 30 minutes, 100 ml. of the same solvent containing 10 g. of adipic acid was added dropwise during 60 minutes. After the addition, agitation was continued for 10 more minutes. After the reaction was complete, a precipitate of ω,ω'-diaminopoly-α-methylstyrene-adipic acid salt was obtained by adding a 10-fold volume of methanol. Yield, 85.00%; Melting point, 160–164°C.

To a glass polymerization tube, 5.2468–1.3117 g. of ε-amino-n-caproic acid and 1.1985–4.794 g. of the ω,ω'-diaminopoly-α-methylstyrene were added and polymerization was carried out under a nitrogen atmosphere at 220°C for 3 hours and at 240°C for 2 hours. The results are shown in Table 4–1.

TABLE 4-1

| Exp. No.: | ε-Amino-n-caproic acid (g.) | (II)[1] (g.) | $F_2$ | Melting point (° C.) | Intrinsic viscosity | Density (g./cm.³) |
|---|---|---|---|---|---|---|
| 4-1 | 5.2468 | 1.1985 | 0.145 | 215-219 | 0.745 | 1.150 |
| 4-2 | 3.9351 | 2.3970 | 0.293 | 208-212 | 0.638 | 1.120 |
| 4-3 | 2.6231 | 3.5955 | 0.438 | 200-204 | 0.543 | 1.110 |
| 4-4 | 1.3117 | 4.7940 | 0.617 | 190-196 | 0.445 | 1.100 |

[1] ω,ω'-α-diaminopoly-α-methylstyrene.

To a glass polymerization tube, 4.6785–0.9357 g. 11-amino-undecanoic acid and 0.5993–2.3970 g. of the ω,ω'-diaminopoly-α-methylstyrene were added and polymerization was carried out under a nitrogen atmosphere at 220°C for 3 hours and then in vacuo of 0.1 mmHg for 2 hours. The results are shown in Table 4–2.

TABLE 4-2

| Exp. No.: | 11-Amino-n-undecanoic acid (g.) | (II)[1] (g.) | $F_2$ | Melting point (° C.) | Intrinsic viscosity | Density (g./cm.³) |
|---|---|---|---|---|---|---|
| 4-5 | 3.7428 | 0.5993 | 0.159 | 185-189 | 0.663 | 1.060 |
| 4-6 | 2.8071 | 1.1985 | 0.324 | 184-187 | 0.543 | 1.065 |
| 4-7 | 1.8714 | 1.7978 | 0.483 | 179-183 | 0.500 | 1.065 |
| 4-8 | 0.9357 | 2.3970 | 0.684 | 175-180 | 0.455 | 1.070 |

[1] ω,ω'-diaminopoly-α-methylstyrene.

To a glass polymerization tube, 5.246–1.312 g. of adipic acid-hexamethylenediamine salt and 0.5993–2.3970 g. of the ω,ω'-diaminopoly-α-methylstyrene were added and polymerization was carried out under a nitrogen atmosphere at 220°C for 1 hour, and 270°C for 1 hour, and then in vacuo for 1 hour.

The results are shown in Table 4–3.

TABLE 4-3

| Exp. No.: | Acid-hexamethylenediamine salt (g.) | (II)[1] (g.) | $F_2$ | Melting point (° C.) | Intrinsic viscosity | Density (g./cm.³) |
|---|---|---|---|---|---|---|
| 4-9 | 5.246 | 0.5993 | 0.125 | 250-255 | 0.601 | 1.120 |
| 4-10 | 3.935 | 1.1985 | 0.250 | 238-242 | 0.534 | 1.110 |
| 4-11 | 2.623 | 1.7978 | 0.375 | 228-232 | 0.501 | 1.100 |
| 4-12 | 1.312 | 2.3970 | 0.555 | 212-216 | 0.451 | 1.090 |

[1] ω,ω'-diaminopoly-α-methylstyrene.

To a glass polymerization tube, 5.3664–1.3416 g. of m-xylene diamine-adipic acid salt and 0.5993–2.3970 g. of the ω,ω'-diaminopoly-α-methylstyrene were added and polymerization was carried out by heating under a nitrogen atmosphere at 180°C for 3 hours, the temperature was then raised to 260°C during 1 hour, and maintained at 260°C in vacuo of 0.1 mmHg for 1 hour. The results are shown in Table 4—4.

TABLE 4-4

| Exp. No.: | M-xylene-diamine-adipic acid salt (g.) | (II)[1] (g.) | $F_2$ | Melting point (° C.) | Intrinsic viscosity | Density (g./cm.³) |
|---|---|---|---|---|---|---|
| 4-13 | 5.3664 | 0.5993 | 0.147 | 230-235 | 0.751 | 1.170 |
| 4-14 | 4.0248 | 1.1985 | 0.294 | 218-222 | 0.601 | 1.150 |
| 4-15 | 2.6832 | 1.7978 | 0.431 | 210-214 | 0.478 | 1.140 |
| 4-16 | 1.3416 | 2.3970 | 0.578 | 198-203 | 0.321 | 1.100 |

[1] ω,ω'-diaminopoly-α-methylstyrene.

EXAMPLE 5

A three-necked flask equipped with stirrer, condenser, and nitrogen inlet and outlet was filled with nitrogen and the flask was kept at −50°C. To the flask, 2 mole (239.7 g.) of α-methylstyrene, 240 ml. of methylene chloride, and 23 ml. of thionyl chloride were added, then 3.37 g. of tin tetrachloride was added and polymerization was carried out with agitation at −50°C for 12 hours. After the polymerization was complete unreacted thionyl chloride was removed by vacuum evaporation and the solids were filtered off. An addition of a 10-fold volume of water-methanol mixed solvent containing 10% water gave a precipitate, which was washed sufficiently with 400 ml. of methanol and a powder polymer was obtained.

Yield, 65%; Softening point, 170–175°C; Intrinsic viscosity, 0.190; Molecular weight calculated from the viscosity, 4400; chlorine analyzed, 1.69%; Molecular weight calculated from analyzed chlorine content, 4200.

By using the ω,ω'-dichloropoly-α-methylstyrene thus obtained, an experiment similar to that of Example 4 was carried out. The results are shown in Table 5–1.

TABLE 5-1

| Experiment Number | 5-1 |
|---|---|
| ε-Amino-n-caproic acid (g) | 5.2467 |
| ω,ω'-Diaminopolystyrene-adipic acid salt (g) | 1.1984 |
| $F_2$ | 0.147 |
| Melting Point (°C) | 213-217 |
| Intrinsic Viscosity | 0.813 |
| Density (g/cm³) | 1.128 |

EXAMPLE 6

A three-necked flask equipped with stirrer, condenser, and nitrogen inlet and outlet was filled with nitrogen. To the flash, 239.7 g. of α-methylstyrene, 240 ml. of methylene chloride, and 46.6 ml. of thionyl chloride were added and the flask was kept at −50°C. After adding 6.75 g. of anhydrous ferric chloride, polymerization was carried out with agitation at −50°C for 12 hours. After the polymerization was complete, unreacted thionyl chloride was removed by vacuum evaporation and the solids were filtered off. An addition of water-methanol mixed solvent containing 10% water gave a precipitate, which was washed with 400 ml. of methanol and a powdery polymer was obtained.

Yield, 70%; Softening point, 160–165°C; Intrinsic viscosity, 0.095; Molecular weight calculated from viscosity, 2100; chlorine analyzed, 3.55%; Molecular weight calculated from the analyzed chlorine content, 2000.

By using the ω,ω'-dichloropoly-α-methylstyrene thus obtained by the above process, an experiment similar to that of Example 4 was carried out. The results are shown in Table 6-1

TABLE 6-1

| Experiment Number | 6-1 |
|---|---|
| ε-Amino-n-caproic acid (g) | 5.2468 |
| ω,ω'-Diaminopoly-α-methylstyrene (g) | 1.1983 |
| $F_2$ | 0.145 |
| Melting Point (°C) | 216–220 |
| Intrinsic Viscosity | 0.742 |
| Density (g/cm³) | 1.131 |

What is claimed is:

1. A polymer comprising a plurality of repeating units of the formula:

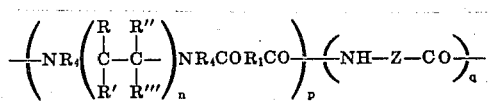

in which:
R, R', R" and R''' are members selected from the group consisting of alkyl radicals having up to 8 carbon atoms, aralkyl radicals having up to 10 carbon atoms, aryl radicals having up to 10 carbon atoms, alkoxy radicals having up to 8 carbon atoms;

R, R', R" and R''' also collectively represent a 3–7 atom residue of a carbon ring structure which may contain up to two hetero oxygen atoms;

$R_1$ is a member selected from the group consisting of alkylene radicals having from two–12 carbon atoms and arylene radicals having from six–12 carbon atoms;

$R_4$ is a member selected from the group consisting of hydrogen and alkyl radicals having up to six carbon atoms;

Z is a member selected from the group consisting of -$R_2NHCOR_1$- and $R_3$;

$R_2$ is a member selected from the group consisting of alkylene radicals having from two–12 carbon atoms and arylene radicals having from six–12 carbon atoms;

$R_3$ is an alkylene radical having from five–16 carbon atoms; n is an integer having a value of from m 1 to 500; and p and q represent the relative molar ratio of each unit and are defined by the formula $(p/p + q) + (q/p + q) = 1$.

2. The polymer of claim 1 of the formula

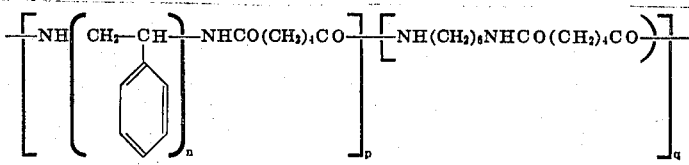

3. The polymer of claim 1 of the formula

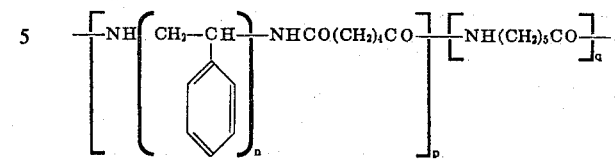

4. The polymer of claim 1 of the formula

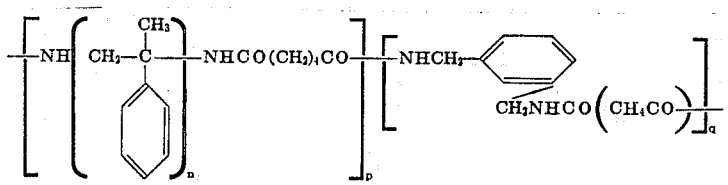

5. The polymer of claim 1 of the formula

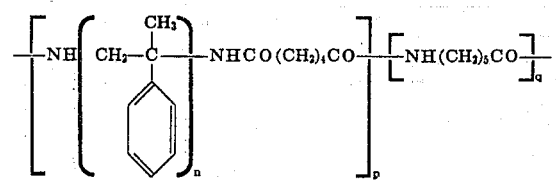

6. The polymer of claim 1 of the formula

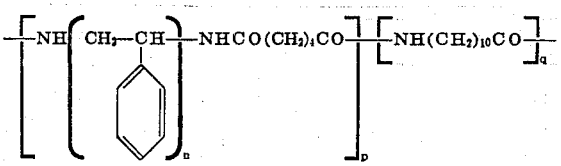

7. A method of making a block compolymer comprising:
a. polymerizing an ethylenically unsaturated monomer of the formula:

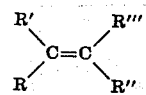

wherein
R, R', R" and R''' are members selected from the group consisting of alkyl radicals having up to 8 carbon atoms, aralkyl radicals having up to 10 carbon atoms, aryl radicals having up to 10 carbon atoms, alkoxy radicals having up to 8 carbon atoms; and R, R', R" and R''' also collectively represent a three–seven atom residue of a carbon ring structure which may contain up to two hetero oxygen atoms;

in the presence of at least a stoichiometric quantity of molecular halogen or an acid polyhalide containing at least two halogen atoms per molecule, the molecular weight of the halogen, X, being at least 35.5 and a catalytic amount of a Lewis Acid to form a ω,ω'-dihalopolymer of the formula:

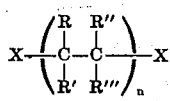

wherein
R, R', R'', R''' and X are as defined aforesaid; and n is an integer having a value of from 1 to 500.

b. subjecting said ω,ω'-dihalopolymer to the reaction of at least a stoichiometric quantity of nitrogen-containing compound of the formula:

$R_4RH_2$ wherein $R_4$ is a member selected from the group consisting of hydrogen and alkyl radicals having up to 6 carbon atoms; to form a ω,ω'-diaminopolymer of the formula:

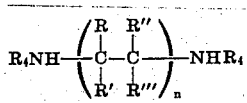

wherein R, R', R'', R''', n and $R_4$ are as defined aforesaid;

c. polymerizing said ω,ω'-diaminopolymer in the presence of a polycondensable monomer; and
d. recovering said block copolymer from the reaction mixture.

8. A method according to claim 7 wherein said polycondensable monomer is a member selected from the group consisting of amino acids and their lower aliphatic and phenolic esters having up to 21 carbon atoms inclusive of the ester portion; alkylene and arylene diamines having up to 21 carbon atoms; and dicarboxylic acids and their esters and halides having up to 21 carbon atoms inclusive of the ester portion.

9. A method of making block copolymers comprising a plurality of repeating units of the formula:

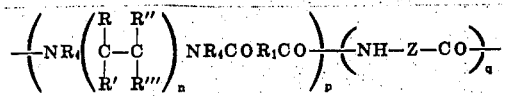

in which:
R, R', R'', R''' are members selected from the group consisting of alkyl radicals having up to eight carbon atoms, aralkyl radicals having up to 10 carbon atoms, aryl radicals having up to 10 carbon atoms, alkoxy radicals having up to 8 carbon atoms;
R, R', R'', and R''' also collectively represent a three–7 atom residue of a carbon ring structure which may contain up to two hetero oxygen atoms;
$R_1$ is a member selected from the group consisting of alkylene radicals having from two–12 carbon atoms and arylene radicals having from six–12 carbon atoms;
$R_4$ is a member selected from the group consisting of hydrogen and alkyl radicals having up to six carbon atoms;
Z is a member selected from the group consisting of $-R_2NHCOR_1-$ and R
$R_2$ is a member selected from the group consisting of alkylene radicals having from two–12 carbon atoms and arylene radicals having from six–12 carbon atoms;

$R_3$ is an alkylene radical having from five–16 carbon atoms;
n is an integer having a value of from 1 to 500; and
p and q represent the relative molar ratio of each unit and are defined by the formula $(p/p+q)+(q/p+q)=1$,
said method comprising
a. polymerizing an ethylenically unsaturated monomer of the formula:

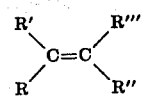

wherein R, R', R'' and R''' are as defined aforesaid in the presence of at least a stoichiometric quantity of molecular halogen or an acid polyhalide containing at least two halogen atoms per molecule, the molecular weight of the halogen, X, being at least 35.5 and a catalytic amount of a Lewis Acid to form a ω,ω'-dihalopolymer of the formula:

wherein R, R', R'', R''', X and n are defined aforesaid;
b. subjecting said ω,ω'-dihalopolymer to the reaction of at least a stoichiometric quantity of nitrogen-containing compound of the formula:

$R_4NH_2$ wherein $R_4$ is as defined aforesaid, to form a ω,ω'-diaminopolymer of the formula

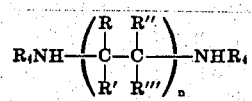

wherein R, R', R'', R''', n and $R_4$ are as defined aforesaid; and
c. subjecting said ω,ω'-diaminopolymer to the reaction of the acid, halide or ester of a dicarboxylic acid of the formula $HOCOR_1COOH$, wherein $R_1$ is as defined aforesaid, and a member selected from the group consisting of $H_2NR_2NH_2$ and $H_2NR_3COOH$, wherein $R_2$ and $R_3$ are as defined aforesaid;
d. polymerizing the resulting mixture; and
e. recovering said block copolymer from the reaction mixture.

10. A method according to claim 9 wherein polymerization step (d) is a melt polymerization in an inert atmosphere at a temperature of 100°–300°C.

11. A method according to claim 9 wherein polymerization step (d) is conducted in an inert solvent at a temperature between 150°C and the freezing point of the polymerization mixture.

12. A method according to claim 9 wherein the nitrogen containing compound is present in excess of twice the storichiometric amount, based on the halogen content of the ω,ω'-dihalopolymer.

13. A method according to claim 9 wherein the reaction of the nitrogen-containing compound and the ω,ω'-dihalopolymer is conducted at a temperature between room temperature and 100°C.

14. A method according to claim 13 wherein the nitrogen-containing compound is used in the form of its alkali metal salt and the reaction is conducted in the presence of an inert non-polar solvent.

15. A method according to claim 9 wherein the halogenating agent is a member selected from the group consisting of thionyl chloride, phosgene, phosphorus pentachloride, phosphorus trichloride, phosphorus oxychloride, phosphorus tribromide, chlorine, bromine and iodine.

16. A method according to claim 15 wherein the ω,ω'-dihalopolymer is formed at a temperature of −100°C to 75°C.

17. A method according to claim 15 wherein the Lewis Acid is a member selected from the group consisting of beryllium dichloride, cadmium dichloride, zinc dichloride, boron trichloride, boron tribromide, aluminium trichloride, aluminium tribromide, gallium trichloride, titanium tetrachloride, titanium tetrabromide, zirconium tetrachloride, stannous chloride, stannic chloride, stannic bromide, antimony pentachloride, antimony trichloride, bismuth trichloride, ferric chloride, and vanadium tetrachloride.

18. A method according to claim 9 wherein the ethylenically unsaturated monomer is a member selected from the group consisting of ethylene, proplene, isobutylene, styrene, α-methyl styrene, nuclear substituted styrenes, nuclear substituted α-methyl styrenes, vinylmethyl ether, α,β-dimethoxyethylene, vinylphenyl ether, stilbene, vinyloctyl ether, and acenaphthylene.

* * * * *